United States Patent
Huschenbett et al.

(10) Patent No.: US 8,050,848 B2
(45) Date of Patent: Nov. 1, 2011

(54) METHOD AND SYSTEM FOR IGNITING A LEAN FUEL MIXTURE IN A MAIN CHAMBER OF AN INTERNAL COMBUSTION ENGINE

(75) Inventors: Matthias Huschenbett, Parker, CO (US); Greg Beshouri, Berkeley, CA (US)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 363 days.

(21) Appl. No.: 12/289,346

(22) Filed: Oct. 24, 2008

(65) Prior Publication Data

US 2010/0101533 A1    Apr. 29, 2010

(51) Int. Cl.
*F02B 19/10* (2006.01)
*F02B 19/12* (2006.01)

(52) U.S. Cl. ......... 701/104; 701/105; 123/267; 123/275

(58) Field of Classification Search ............ 123/260, 123/275, 406.45, 267, 268, 277; 701/104, 701/105
See application file for complete search history.

(56) References Cited

U.S. PATENT DOCUMENTS

| | | | |
|---|---|---|---|
| 6,144,015 A * | 11/2000 | Chiu et al. | 219/270 |
| 6,177,653 B1 * | 1/2001 | Chiu et al. | 219/270 |
| 6,512,204 B1 * | 1/2003 | Chiu et al. | 219/270 |
| 7,275,916 B2 | 10/2007 | Smith et al. | |
| 2005/0061295 A1 * | 3/2005 | Minato | 123/406.45 |
| 2010/0185381 A1 * | 7/2010 | VanDyne et al. | 701/105 |

* cited by examiner

*Primary Examiner* — Erick Solis
(74) *Attorney, Agent, or Firm* — Dykema Gossett PLLC

(57) ABSTRACT

A method and system for igniting a lean fuel mixture in a main chamber of an internal combustion engine by igniting a rich air-fuel mixture in a pre-combustion chamber which is fuelled using a controlled valve. For a stable and consistent ignition of the main chamber and simultaneous reduction of emission of the internal combustion engine, a closed loop control adjusts the fuel amount and the fuelling time for the pre-combustion chamber in order to achieve a light off in an optimal time window and by sufficient ignition energy.

14 Claims, 3 Drawing Sheets

METHOD AND SYSTEM FOR IGNITING A LEAN FUEL MIXTURE IN A MAIN CHAMBER OF AN INTERNAL COMBUSTION ENGINE

BACKGROUND OF THE INVENTION

1. Field of the Invention

This invention relates to a method for igniting a lean fuel mixture in a main chamber of an internal combustion engine, said internal combustion engine being fitted with a pre combustion chamber which holds a rich air-fuel mixture that is ignited for igniting the lean fuel mixture in the main chamber, whereas the pre combustion chamber is fuelled using a controlled valve.

2. The Prior Art

In internal combustion engines (ICE) the combustion must be carefully monitored and controlled in order to optimize the performance and minimize emissions. In large industrial engines a commonly used strategy to reduce the NOx emissions is to use lean fuel mixtures, i.e., fuel mixtures with excessive air as compared to stoichiometric mixtures (mixtures of fuel and air whereas the amount of air is equal to the theoretical amount needed for the complete combustion of the fuel). However, lean mixtures are difficult to ignite. Failure to ignite the fuel mixture is unacceptable because then the unburned fuel is a pollutant in itself. To overcome the problem of misfires (failure to ignite the fuel mixture) pre combustion chambers are often used which typically is a small cavity in the cylinder head or the spark plug with an opening towards the main (combustion) chamber. The pre chamber is fuelled with a rich mixture (easy to ignite) whereas the main chamber is fuelled with a lean (hard to ignite) mixture. The fuel in the pre chamber is then ignited and as the burning fuel propagates into the main chamber the lean mixture is ignited as a secondary effect, hereby securing stable over all combustion.

However, the combustion of the rich fuel mixture in the pre chamber itself may cause unacceptable emissions, specifically disproportionate amounts of NOx and CO. It is well known that an unacceptable amount of emissions come from over fuelling of pre chambers. But it is very difficult to monitor the fuel admission in the pre chamber such that it becomes rich enough to reliably be ignited but not richer than that to avoid excess emissions. Clearly, there is a trade off between stable combustion and excess emission.

In commonly used solutions the fuel admission to the pre chamber is calibrated. However, the optimal fuel amount (giving stable ignition subject to minimum emission) may change over time due to changes in turbo charge. Moreover, component wear in the fuel admission system may cause that imprecise, excessive or insufficient fuel is injected. Finally the optimum fuel amount for each individual pre chamber will vary due to unique mixing and scavenging characteristics of each engine cylinder.

Another state of the art pre chamber fuel control is done by check valves. The check valve opens when the pressure in the pre chamber falls below the fuel supply pressure. Thus the pre chamber fuelling typically starts at the beginning of the main chamber gas exchange phase and stops right after beginning of compression. This concept flashes the pre chamber and fuels the main chamber during scavenging. Partly this fuel is wasted directly through the exhaust port. Adjustment of the air fuel ratio is just possible by changing the fuel supply pressure. State of the art controls use for this purpose a functional correlation to air manifold pressure or load. Mapping of pre chamber performance is rather complicated and not practice. Hence a precise pre chamber air fuel ratio adjustment over a range of load, speed, main chamber air fuel ratio and cylinder level variation is impossible. Furthermore check valves are subject to contamination and clogging. Besides imprecise fuelling a check valve pre chamber is also characterized by a high level of inconsistency.

The U.S. Pat. No. 7,275,916 B2 shows an integrated engine/compressor control for gas transmission compressors that uses engine operating data, e.g. engine speed, intake manifold air pressure, ignition system energy, etc., and compressor operating data, e.g. load steps on each cylinder, suction pressure, discharge pressure, etc. The controller then processes this data to determine various control parameters for engine, e.g. ignition timing, pre-chamber fuelling quantity, pre-chamber fuelling rate, etc., and compressor, e.g. compressor load step, compressor suction and/or discharge bottle conditions, etc. The controller can be programmed to achieve engine optimization in terms of fuel consumptions and emissions. Such a control requires numerous sensors providing different input signals to the controller and, hence, is very costly.

It is an object of the invention to provide a system and a method for igniting a lean fuel mixture in a main chamber of an internal combustion engine, which ensures a stable and consistent ignition of the main chamber and simultaneously reduces the emission of the internal combustion engine.

SUMMARY OF THE INVENTION

It has been realised that an optimal ignition can just be ensured by consistent as well as timing and pulse width based fuel admission to the pre combustion chamber. Such a performance can just be achieved by closed loop pre chamber fuel control in which pre chamber air fuel ratio is adjusted to an optimal level. This optimal level can be characterized on one hand by a light off in an optimal time window and by sufficient ignition energy. On the other hand said ignition characteristics have to be optimized in a way to achieve lowest possible NOx and CO emission contribution from the pre chamber to the engine out emission. This is achieved by measuring a measurement value in the pre combustion chamber, determining a value characteristic for the pre combustion chamber performance from said measurement value, determining the deviation of the characteristic value from a given set point, determining the fuel amount and fuelling timing for the pre combustion chamber from said deviation and using said determined fuel amount and fuelling timing to control the controlled valve for fuelling the pre combustion chamber. The controller can maintain the optimal air-fuel ratio in the pre combustion chamber regardless of operating conditions. The controller can also detect and correct individual pre chamber imbalance and is adaptive to natural wear of the system components and any other changes of the environment (e.g. fuel supply pressure) as the controller is able to modify ignition timing and/or ignition energy if need be. Furthermore, the inventive system and method eliminates the need for check valve maintenance.

These and other features and advantages of the invention will be apparent to those skilled in the art from the following detailed description, taken together with the accompanying drawings.

DETAILED DESCRIPTION OF THE PREFERRED EMBODIMENT

Figure 1:
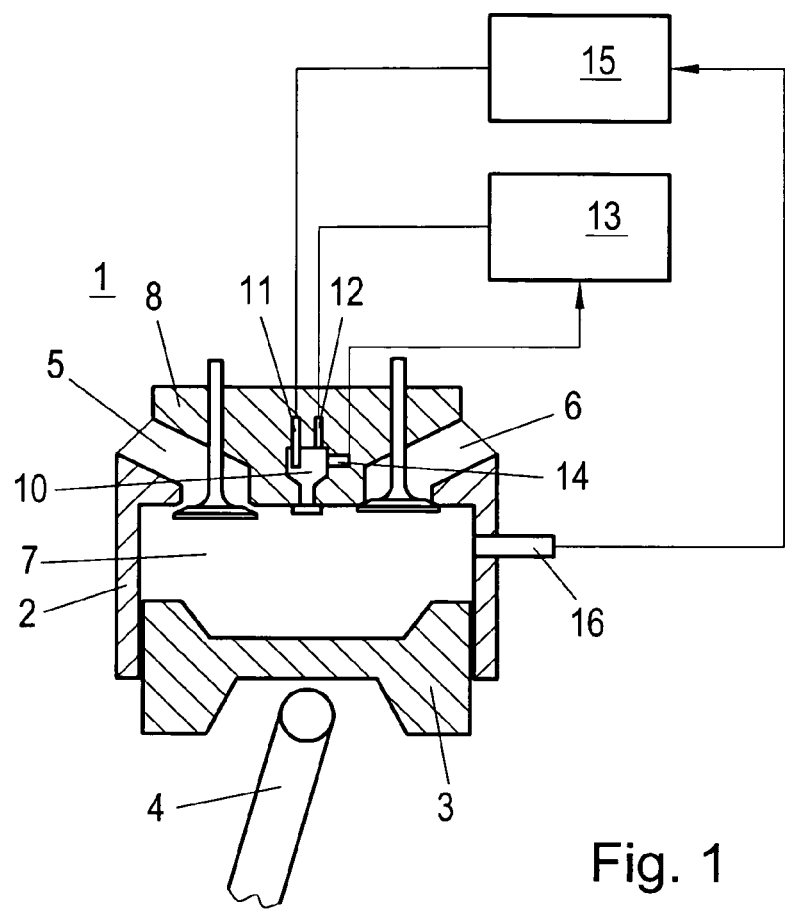
FIG. 1 is a detail of an internal combustion engine with a pre combustion chamber.

FIG. 1 shows a part of a conventional internal combustion engine 1, namely a cylinder 2 in which a piston 3 is reciprocatingly moved. The internal combustion engine is e.g. a large bore gas engine driving a compressor as used in the transmission of natural gas. The piston 3 is connected to the crank shaft (not shown) of the engine in known manner by a piston rod 4. The intake port 5 and the exhaust port 6 are opened and closed either with valves which are controlled by a (either mechanical or electronic) valve control (not shown) or by the piston covering or exposing the port area (as in the case of a typical two stroke engine). Via the intake line and intake port 5 air or air/fuel mixture is fed to the main combustion chamber 7. The fuel, e.g. natural gas, could also be fed to the main chamber 7 by a fuel injection valve (not shown), e.g. arranged in the cylinder head 8 or the intake line. Internal combustion engines are well known, that is why it is not gone into details regarding the design of such engines here.

Figure 2:
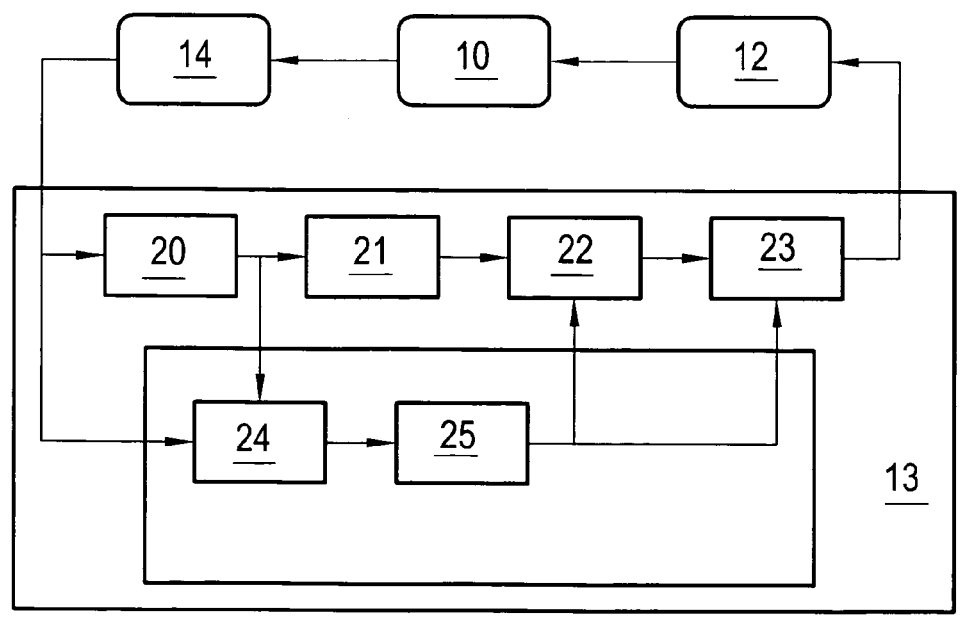
FIG. 2 is a block diagram of the new closed loop control.

Especially in large industrial engines lean fuel mixtures are used to reduce the NOx emissions and to increase efficiency. A pre-combustion chamber 10 is provided in the cylinder head 8 for igniting the lean fuel mixture in the main chamber 7. To this end fuel is fed to the pre-combustion chamber 10 by a controlled valve 12, e.g., an electronically controlled solenoid valve, arranged in the cylinder head and opening into the pre-combustion chamber 10. The rich mixture in the pre-combustion chamber 10 is ignited using a spark plug 11, but other ignition devices, like, e.g., corona or plasma discharge devices, are also suitable. The pre-combustion chamber 10 could also be integrated into the spark plug 11 or into any other ignition device. The combustion performance in the pre-combustion chamber 10 is monitored with a measurement device 14, e.g., an ion current sensing device. The fuel amount fed to the pre-combustion chamber 10 and the fuelling time is controlled by a pre-combustion chamber controller 13 in a closed control loop as described in detail with reference to FIG. 2 below.

The closed loop control starts with measuring a value characteristic for the pre-combustion chamber 10 combustion performance with measurement device 14, e.g., a ion sense device measuring the ion current in the pre-combustion chamber 10. A moving average of the measurement signal derived from measurement device 14 could be formed in a moving average unit 20 in order to improve the measurement signal quality. This measurement signal is evaluated in the pre-combustion chamber controller 13 and a characteristic value of the pre-combustion chamber 10 combustion performance is determined in a characteristic value unit 21. It would of course also be possible to determine a couple of characteristic values in characteristic value unit 21. Characteristic values are, e.g., the peak, peak location, gradients of several sections, integral or combinations of such a periodical measurement signal. The deviation of the characteristic value from an optimal set point is determined in a deviation unit 22 and is used for adjusting the timing and pulse width in fuelling timing unit 23. The timing and the pulse width are fed back to the pre-combustion chamber controller 13 to close the control loop. The pulse width and timing, in dependence from the fuel pressure in the fuel supply and the pressure in the pre-combustion chamber 10, essentially defines the amount of fuel fed to the pre-combustion chamber 10. The timing sets the start time for fuelling to the pre-combustion chamber 10. The ignition of the rich fuel mixture in the combustion chamber 10 with the spark plug 11 can be controlled by an ignition controller 15 or the main engine controller and is independent form the pre-combustion chamber 10 fuelling control.

The pre combustion chamber controller 13 or a ignition controller 15 is preferably a micro-processor, or any other programmable electronic device, into which the above explained functions are programmed. The pre combustion chamber controller 13 or the ignition controller 15 could also be integrated into the main engine controller for the internal combustion engine.

The a priori definition of absolute optimal set points is rather difficult, if not impossible, due to different pre combustion chamber 10 and gas engine designs, various loads and speeds as well as main chamber 7 air fuel ratios, cylinder variations etc. Starting with reasonable set points an adaptive self tuning process is used to determine the optimal set points. In an evaluation unit 24 of the pre combustion chamber controller 13 a cycle to cycle evaluation of the measurement signal allows a clear judgment of the pre combustion chamber 10 performance concerning the timing and magnitude of the ignition energy. Successive changing of the pre combustion chamber controller 13 timing and pulse width in a calibration unit 25 enables the optimization of the set points for the characteristic value of the measurement signal. The optimization is preferably defined by sufficient pre combustion chamber 10 performance concerning timing and magnitude of ignition energy with constrain to lowest possible NOx and CO emission contribution. Such an optimization algorithm can be programmed into the pre combustion chamber controller 13.

The control can be done on a per pre chamber basis or overall for the engine. Hence, it is also possible to compensate any imbalance between the cylinders of the engine or even variations (spark plug etc.) between pre chambers on the same cylinder Optimal pre combustion chamber 10 performance can be defined by sufficient ignition energy at a certain time or within a certain time window. This optimal ignition energy for a stable and consistent ignition can be controlled without measurement signals from the main chamber 7. The ignition energy can be controlled by setting the air/fuel ratio in the pre combustion chamber 10. The light off in the pre combustion chamber 10 has to be in a certain time window. The ignition timing is defined by the ignition system. However, ignition in the main chamber is done by flame propagation from the pre to the main chamber 7. With a suitable measurement signal, especially with ion current measurement, it can clearly be determined if the combustion (i.e. "light off") in the pre chamber occurs immediately after ignition. As the main cause for main chamber 7 combustion instability was identified as late combustion in the pre combustion chamber 10 (i.e. late "light off") such a measurement is a clear indication for the pre combustion chamber 10 performance. Since the mixture in the pre combustion chamber 10 is in the range of a stoichiometric mixture a too rich or too lean fuel adjustment will affect the pre chamber 10 performance significantly. Hence, the mixture in the pre combustion chamber 10 has to be adjusted by the closed loop control to provide sufficient ignition energy within in predefined time window. Both can be clearly identified by characteristic values of the measured signal. Within the constraints of these values the mixture is adjusted to the lean side resulting in lowest possible CO and possible NOx emission contribution by the pre chamber. This is explained following in more detail with reference to FIGS. 3 to 5 for the example of ion current measurement.

Figure 3:
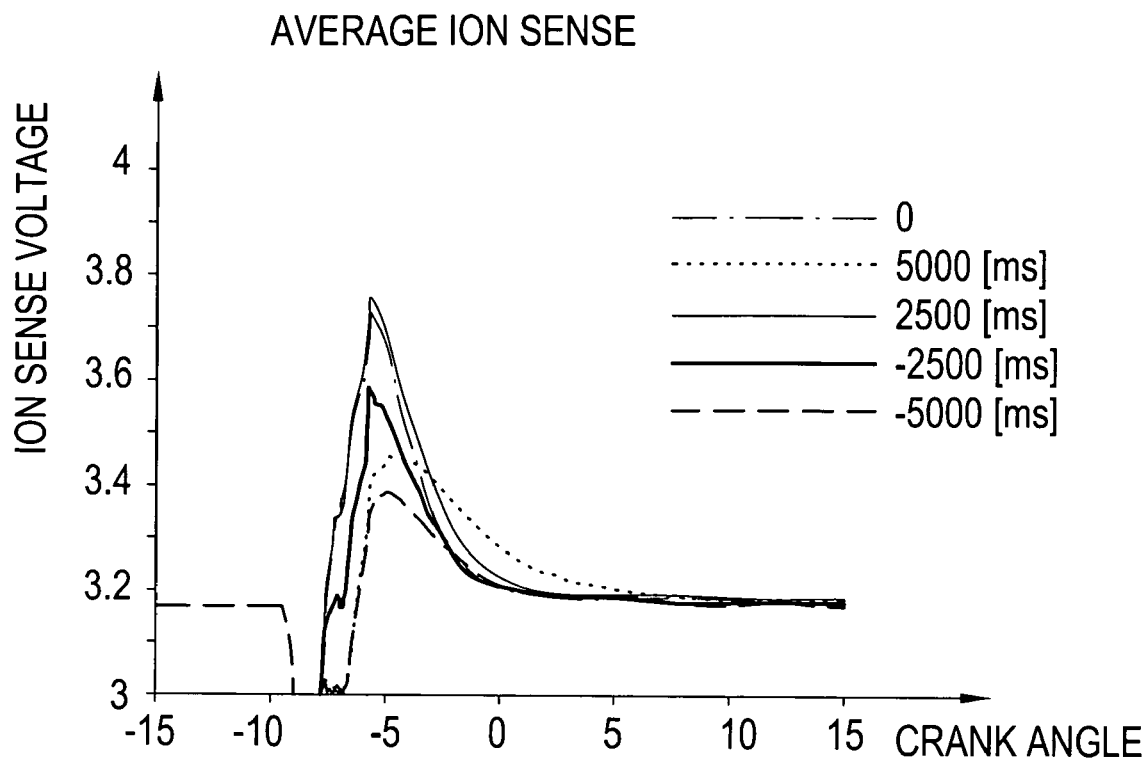
FIGS. 3 to 5 show different graphs based on a measurement signal.
Figure 4:
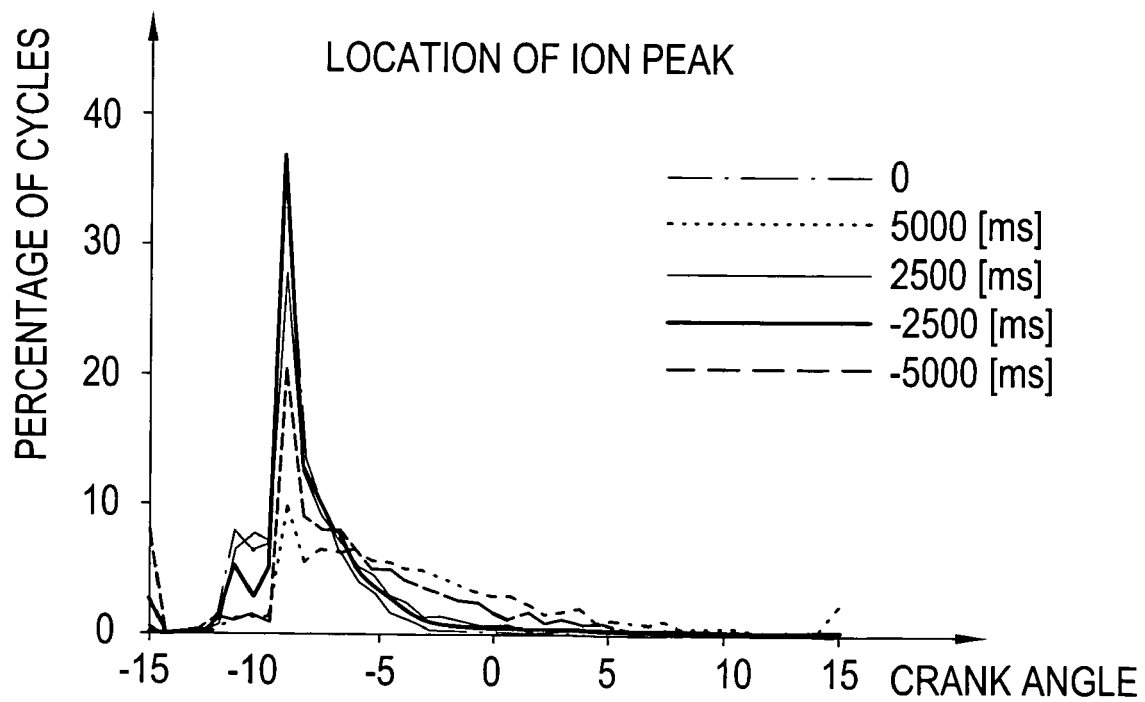
Figure 5:
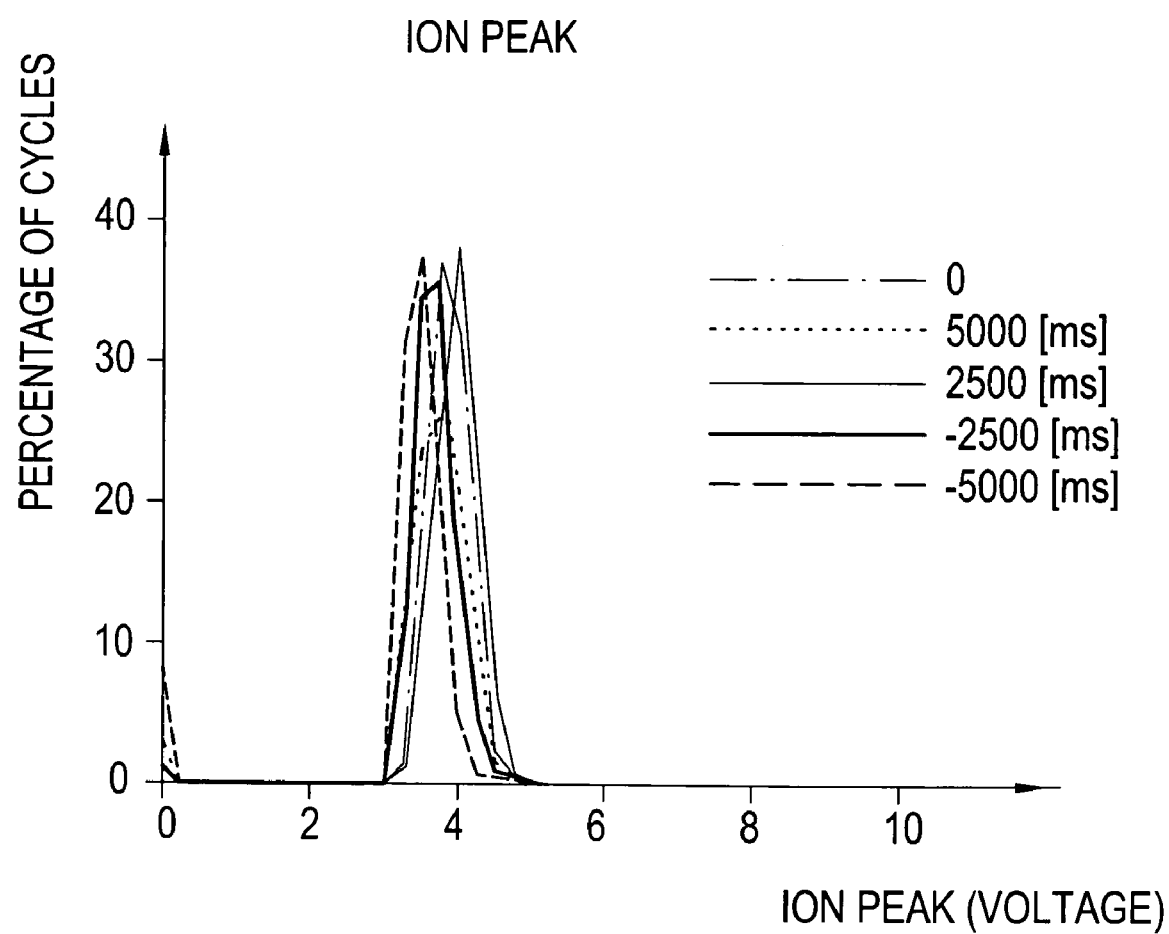

The average ion sense signal for different air/fuel ratio is shown in FIG. 3. The shape can be characterized by a set of several characteristic values like peak, slopes, integral, etc. However, these characteristic values can hardly be defined a priori for an optimal performance. The average ion sense signal represents rather a probability distribution of the peak instead of a real in trace. In general it can be said that the steeper the slopes the more narrow the "light off" window and hence better pre-combustion chamber 10 performance. In order to reduce the CO emissions the optimal adjustment needs to be on the lean side. Hence, not the greatest peak represents by default the optimal performance. The cycle to cycle evaluation in the evaluation unit 24 can clearly define which shape will be the optimal case. The graph in FIG. 4 shows the number of cycles with "light off" at a certain crank angle. Hence, a reliable pre-combustion chamber 10 performance can be achieved around a pulse with offset of 0 ms to −2500 ms (bias values). Lowest CO emission will be achieved closer to −2500 ms. A leaner mixture (−5000 ms) as well as a richer mixture (+2500 ms/+5000 ms) results in an unstable performance. The ignition energy is slightly smaller at −2500 ms than at 0 ms or +2500 ms, as shown in FIG. 5. However, the main objective is a reliable ignition within a defined time frame. Hence, the energy at −2500 ms is still enough for igniting the main chamber. This example clearly shows the possibility of self tuning by evaluating the measured signal without any additional main chamber 7 signals.

Effects of the main chamber 7 air/fuel ratio to the pre combustion chamber 10 air/fuel ratio can be seen in the pre combustion chamber 10 and, therefore, no measurement signals from the main chamber 7 are needed for the control of the pre combustion chamber 10. Optimization of main chamber 7 air/fuel ratio and emission can be done by a separate system, e.g. the conventional engine controller. The pre combustion chamber controller 13 ensures stable ignition and allows therefore to go to leaner mixtures in the main chamber 7 without worsen combustion stability in the main chamber 7.

A combined main and pre combustion chamber 10 control offers additional benefits although an optimal pre combustion chamber 10 air/fuel ratio control with the described approach doesn't need any signal from the main chamber 7. The heat release rate in the main chamber 7 can be evaluated based on pressure measurement in the main chamber 7. Since NOx formation is a function of combustion temperature adjustment of heat release rate could further optimize emission reduction. This is possible by using for the pre combustion chamber 10 the explained optimization of the air/fuel ratio combined with the main chamber 7 pressure signal $p_{cyl}$ derived from a pressure measurement device 16, e.g. a piezoelectric pressure sensor, for an optimal adjustment of ignition timing in an ignition controller 15. But also any other suitable measurement signal derived from the main chamber 7 could also be used instead of the main chamber pressure signal. Hence with such a combined control an even better pre combustion chamber 10 performance, stable main chamber 7 combustion and efficiency at a minimum CO and NOx emission level can be achieved. Ignition controller 15 and pre combustion chamber controller 13 could be integrated into the main engine controller.

The invention claimed is:

1. A method of operating an internal combustion engine having a cylinder therein which includes a combustion chamber and a pre-combustion chamber connected thereto, said method comprising the steps of:

supplying a lean air-fuel mixture to said combustion chamber, supplying a rich air-fuel mixture to said pre-combustion chamber through a controlled valve, said rich air-fuel mixture having a higher air-to-fuel ratio than said lean air-fuel mixture, spark igniting said rich air-fuel mixture in said pre-combustion chamber, said ignited rich air-fuel mixture then igniting said lean air-fuel mixture in said combustion chamber, measuring a measurement signal in the pre-combustion, determining a value characteristic for the pre-combustion chamber performance from said measurement signal, determining a deviation of the characteristic value from a given set point, determining a fuel amount and fuelling timing for the pre-combustion chamber from said deviation, and using said determined fuel amount and fuelling timing to control the controlled valve for fuelling the pre-combustion chamber and thereby achieve a stable and consistent ignition in the combustion chamber.

2. The method according to claim 1, comprising using a measurement signal from an ion current sensing device in the pre-combustion chamber as measurement signal.

3. The method according to claim 1, comprising using peak, peak location, gradient of a section, integral of the measurement signal and/or combinations thereof as characteristic values.

4. The method according to claim 1, comprising setting reasonable set points at the beginning of the pre-combustion chamber fuelling control, and using an adaptive self tuning process for continuously determining optimal set points.

5. The method according to claim 4, comprising using a cycle to cycle evaluation of the measurement signal as judgment of the pre-combustion chamber performance for determining the optimal set points.

6. The method according to claim 1, comprising determining a moving average from the measurement signal, and determining the characteristic value from said moving average.

7. The method according to claim 1, comprising using a main chamber measurement signal in addition to the pre-combustion chamber measurement signal to adjust the ignition timing.

8. An internal combustion engine which comprises:

a combustion chamber with an intake port for a lean air-fuel mixture, a pre-combustion chamber which is connected to said combustion chamber and includes an intake valve for a rich air-fuel mixture, a spark ignition means for igniting rich air-fuel mixture in said pre-combustion chamber, which thereafter ignites lean air-fuel mixture in said combustion chamber, a measurement device for measuring a measurement signal in the pre-combustion chamber, means for determining a value characteristic for the pre-combustion chamber performance from said measurement signal, means for determining a deviation of the characteristic value from a given set point, means for determining a fuel amount and fuelling timing for the pre-combustion chamber from said deviation, and means for controlling the intake valve for the pre-combustion chamber based on the determined fuel amount and fuelling timing to thereby achieve a stable and consistent ignition in the combustion chamber.

9. The internal combustion engine according to claim 8, wherein the measurement device comprises an ion current sensing device arranged in the pre-combustion chamber.

10. The internal combustion engine according to claim 8, wherein peak, peak location, gradient of a section, integral of the measurement signal and/or combinations thereof are used as characteristic values.

11. The internal combustion engine according to claim 8, wherein reasonable set points are set in the deviation unit at the beginning of the pre-combustion chamber fuelling control and the pre-combustion chamber controller further comprises a calibration unit for determining optimal set points in an adaptive self tuning process.

12. The internal combustion engine according to claim 11, wherein a cycle to cycle evaluation of the measurement signal is used in the calibration unit as judgment of the pre-combustion chamber performance for determining the optimal set points.

13. The internal combustion engine according to claim 8, wherein the pre-combustion chamber controller further comprises a moving average unit for determining a moving average from said measurement signal.

14. The internal combustion engine according to claim 8, further comprising a measurement device for measuring a measuring signal in the main chamber and an ignition controller for adjusting the ignition timing on basis of the measured main chamber measurement signal.

* * * * *